United States Patent
Wakao (10) Patent No.: US 8,122,762 B2
(45) Date of Patent: Feb. 28, 2012

(54) METHOD OF ESTIMATING TIRE CONTACT STATE, TIRE CONTACT STATE ESTIMATING APPARATUS AND TIRE FOR TIRE CONTACT STATE ESTIMATION

(75) Inventor: Yasumichi Wakao, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 0 days.

(21) Appl. No.: 12/597,701

(22) PCT Filed: Apr. 22, 2008

(86) PCT No.: PCT/JP2008/057724
§ 371 (c)(1),
(2), (4) Date: Jan. 25, 2010

(87) PCT Pub. No.: WO2008/136303
PCT Pub. Date: Nov. 13, 2008

(65) Prior Publication Data
US 2010/0147062 A1  Jun. 17, 2010

(30) Foreign Application Priority Data
Apr. 27, 2007 (JP) .................... 2007-119593

(51) Int. Cl.
*G01M 17/02* (2006.01)
(52) U.S. Cl. .................................................. 73/146
(58) Field of Classification Search ............ None
See application file for complete search history.

(56) References Cited

U.S. PATENT DOCUMENTS
| | | | |
|---|---|---|---|
| 5,014,551 A * | 5/1991 | Beebe et al. ............... | 73/146 |
| 6,959,593 B2 * | 11/2005 | Mancosu et al. ........... | 73/146 |
| 7,203,579 B2 | 4/2007 | Yokota et al. | |
| 2002/0162389 A1 | 11/2002 | Yokota et al. | |
| 2005/0085987 A1 | 4/2005 | Yokota et al. | |
| 2009/0105921 A1 | 4/2009 | Hanatsuka et al. | |

FOREIGN PATENT DOCUMENTS
| | | |
|---|---|---|
| EP | 1 457 388 A1 | 9/2004 |
| JP | 2002-012006 A | 1/2002 |
| JP | 2002-036836 A | 2/2002 |
| JP | 2002-160620 A | 6/2002 |
| JP | 2003-182475 A | 7/2003 |
| WO | 01/98123 A1 | 12/2001 |
| WO | 2006/135090 A1 | 12/2006 |

OTHER PUBLICATIONS
International Search Report PCT/JP2008/057724, Aug. 5, 2008.
Extended European Search Report dated Oct. 11, 2011 for corresponding European Application No. 08751909.6.

* cited by examiner

*Primary Examiner* — Andre Allen
(74) *Attorney, Agent, or Firm* — Sughrue Mion, PLLC (57) ABSTRACT

Provided is a tire contact state estimating method using a tire for estimating a contact state having a block row, in which a plurality of blocks having different lengths in a tire circumference direction are arrayed, and having a tread pattern, in which the kicking ends of two adjacent blocks of the block row are formed at a constant period. The method detects the periodic vibrations, which are generated when the kicking ends to be propagated from the tire to the knuckle leave the road surface sequentially, by an acceleration sensor attached to a knuckle. The method detects such a vibration level of the frequency waveform in a detection frequency band as is calculated from both a wheel speed and that period, to estimate the grounding state of the tire. Thus, without attaching any sensor to the tire, the grounding state of the running tire can be precisely estimated.

2 Claims, 9 Drawing Sheets

METHOD OF ESTIMATING TIRE CONTACT STATE, TIRE CONTACT STATE ESTIMATING APPARATUS AND TIRE FOR TIRE CONTACT STATE ESTIMATION

CROSS REFERENCE TO RELATED APPLICATIONS

This application is a National Stage of International Application No. PCT/JP2008/057724 filed Apr. 22, 2008, claiming priority based on Japanese Patent Application No. 2007-119593, filed Apr. 27, 2007, the contents of all of which are incorporated herein by reference in their entirety.

TECHNICAL FIELD

The present invention relates to a method of estimating tire contact state, a tire contact state estimating apparatus and a tire used in estimating tire contact state.

BACKGROUND ART

Figure 9:
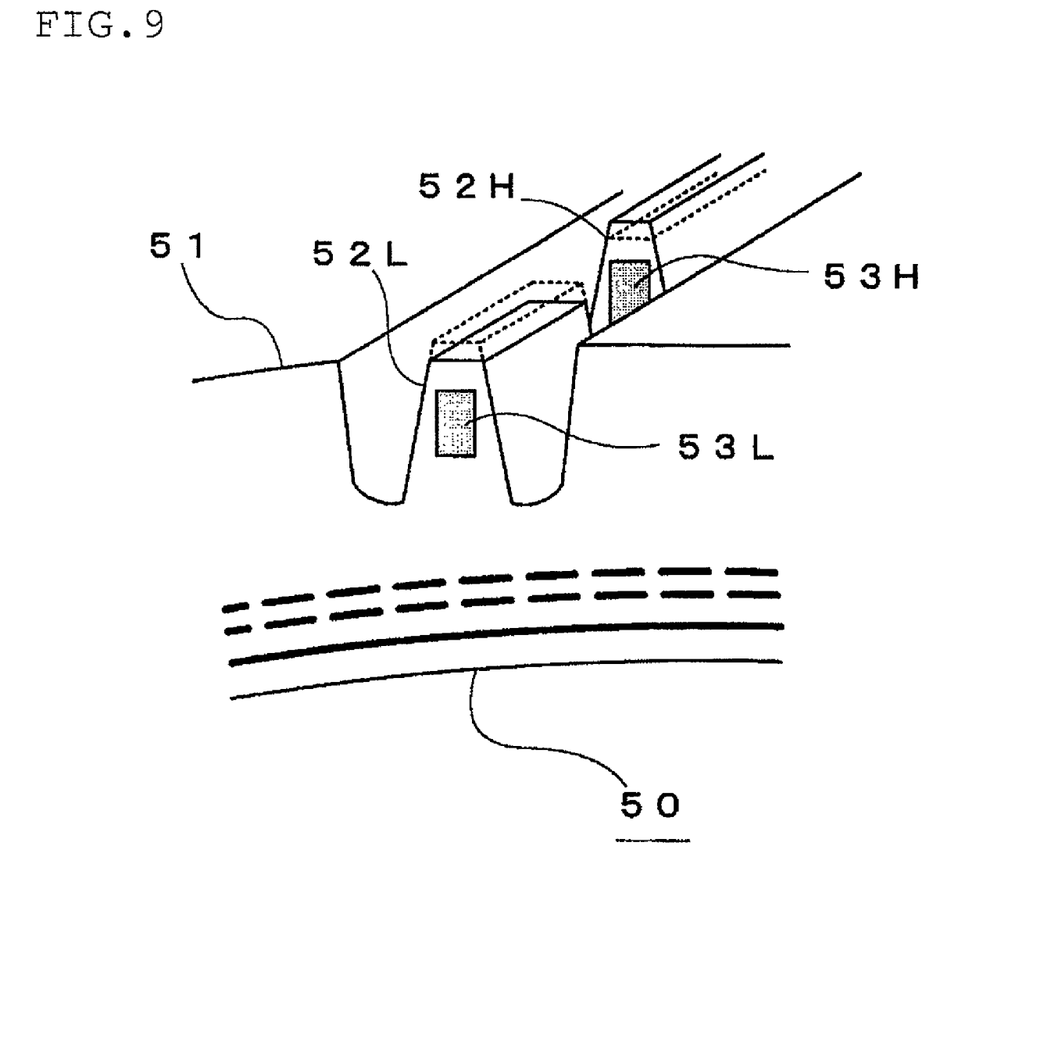
FIG. 9 is a diagram showing the conventional method of estimating road friction coefficient.

In order to enhance running stability of an vehicle, it has been required to estimate a friction coefficient (a road friction coefficient) between a tire and a road or contact state of the tire accurately and then feed it back to a vehicle controller. If the road friction coefficient or contact state of the tire can be estimated in advance, that allows advanced braking by an ABS brake, before operation for danger avoidance such as braking or steering is carried out. It would lead to enhance safety of the vehicle moreover.
As the method of estimating the road friction coefficient, for example, there has been provided that the method comprising steps of detecting wheel speed, detecting a wheel speed fluctuation $\Delta\omega$ when disturbance $\Delta T$ is suffered in accordance with said detected wheel speed signal $\omega$, identifying a transfer function of the wheel as satisfied with $\Delta\omega$ by the least-square method, estimating inclination of the road $\mu$, estimating braking force of the vehicle in accordance with relationship between inclination $\mu$ and braking force obtained in advance, estimating inclination of the road $\mu$ when a slip rate is zero with accordance with said braking force and inclination of the road $\mu$ (refer to the Patent Document 1). Also, as shown in FIG. 9, there has been provided that the method of estimating road friction coefficient comprising steps of forming a sensing block 52H which are higher than a surface of a tread and a sensing block 52L which are lower than the surface of the tread on a tire tread portion 51 of a pneumatic tire 50, sticking a strain gauge 53H and 53L to a side surface which is parallel to each sensing block in a tire circumference direction and estimating road friction coefficient in accordance with a strain level difference detected by the two strain gauge 53H and 53L and a map indicating relationship between the strain level and the road friction coefficient which are obtained in advance (refer to the Patent Document 2).
Patent Document 1: Japanese Unexamined Patent Application Publication 2002-160620
Patent Document 2: Japanese Unexamined Patent Application Publication 2002-36836

DISCLOSURE OF THE INVENTION

Problem to be Resolved by the Invention

However, according to the method of estimating inclination of the road $\mu$ when the slip rate is zero with accordance with inclination of the road $\mu$ which is obtained from wheel speed in advance and estimated braking force of the vehicle, since there is no information about force generated between the tire and road, it is required to estimation time. That is, the method has a limited following capability with respect to road changing.
Also, according to the method of estimating road friction coefficient from the strain level difference detected by the strain gauge 53H and 53L which is respectively stuck with the sensing blocks 52H and 52L having different height, since a sensor such as the strain gauge 53H and 53L is installed to a block directly contacting with the road, it has a sensor durability problem.
In the view of the above problem, the present invention is prepared. It is object to provide the method of estimating tire contact state accurately during running without sticking the sensor to the tire the apparatus thereof and the tire therefor.

Means for Resolving the Problem

In the result of the inventor's intensive research, he has found that since magnitude of vibration, which generates when a trailing edge of the block deformed in a contact patch is released, depends on road friction coefficient $\mu$ (or block slipping state), a tire whose space in a circumference direction of the trailing edge of the block is equal is used and vibration transferred to an unsprung portion of the vehicle such as the wheel, a wheel hub or a knuckle at a cycle corresponding to the space is detected on the unsprung portion so that tire contact state can be accurately detected without arranging the sensor on the tire. On the basis of the above founding, the inventor has reached to the present invention.
According to a first aspect of the present invention, there is provided that a method of estimating tire contact state comprising steps of: using a tire having a tread pattern on which a trailing position of a block or a dummy block is formed in a tire circumference direction at a constant cycle, the block is defined by a plurality of circumferential groove and a lateral groove or a lug groove, and the dummy block projects in a tire axial direction from a land portion continuing in a tire circumference direction; detecting a vibration transmitted to an unsprung portion of a vehicle from the tire on the unsprung portion, which occurs when the trailing edge of the block or the dummy block leaves from a road; estimating a tire contact state in accordance with magnitude of the vibration component in a frequency band corresponding with the cycle of the detected vibration.
According to a second aspect of the present invention, there is provided that the method of estimating tire contact state according to claim 1, wherein the vibration, which is transmitted to a non-rotatable side located on a wheel side than a damping member disposed on the non-rotatable side of the wheel, is detected.
According to a third aspect of the present invention, there is provided that a tire contact state estimating apparatus detecting a tire contact state of a running tire by using a tire having a tread pattern that a trailing position of a block or a dummy block is formed in a tire circumference direction at a constant cycle, the block is defined by a plurality of circumferential groove and a lateral groove or a lug groove, and the dummy block projects in a tire axial direction from a land portion continuing in a tire circumference direction comprising a vibration detector that is arranged on a unsprung portion of a vehicle and detects a vibration on the unsprung portion; a wheel speed sensor that detects velocity of the a wheel; a detected frequency band setting unit that sets a frequency band used in detecting a vibration level in accordance with wheel speed detected by the wheel speed sensor and the cycle;

a vibration level detector which detects magnitude of a vibration component in the frequency band set by the detected frequency band setting unit; an a tire contact state estimating unit which estimates tire contact state in accordance with magnitude of the vibration component detected by the vibration level detector. According to a fourth aspect of the present invention, there is provide that the tire contact state estimating apparatus according to claim 3, wherein the vibration detector is installed to a position where is located on a non-rotatable member of the wheel and located on a wheel side.

According to a fifth aspect of the present invention, there is provided that a tire used in estimating a tire contact state, wherein a trailing position of a block defined by a plurality of circumference direction and a lateral groove or a dummy block is formed at a constant cycle in a tire circumference direction and the block or the dummy block have two difference lengths of the tire circumference direction.

Effect of the Invention

According to the present invention, the method of estimating tire contact state comprises steps of: using a tire having a tread pattern on which a trailing position of a block or a dummy block is formed in a tire circumference direction at a constant cycle, the block is defined by a plurality of circumferential groove and a lateral groove or a lug groove, and the dummy block projects in a tire axial direction from a land portion continuing in a tire circumference direction; detecting a vibration transmitted to an unsprung portion of a vehicle from the tire on the unsprung portion, which occurs when the trailing edge of the block or the dummy block leaves from a road; estimating a tire contact state in accordance with magnitude of the vibration component in a frequency band corresponding with the cycle of the detected vibration. Therefore, without arranging the sensor on the tire, a contact state of the running tire can be estimated accurately. Also, since it is unnecessary to arrange the sensor to the tire, durability of the sensor can be improved as well as the sensor can be changed readily, as compared with a case of arranging the sensor on the tire.

Further, since the method of the present invention is configured in that the vibration, which is transmitted to a non-rotatable side located on a wheel side than a damping member disposed on the non-rotatable side of the wheel, is detected, data is transmitted to the vehicle body from the sensor so that the apparatus can be simplified and deterioration of data can be prevented, without using a slip ring or a radio unit.

As the tire used in estimating the tire contact state, it may be preferable to use the tire having the tread pattern that the trailing position of the block, which is defined by the plurality of circumferential groove and lateral groove, and dummy block, which projects in the tire circumference direction from the land portion continuing in the tire circumference direction, is formed in the tire circumference direction at constant cycle. However, when all of length of the tire circumference direction of the block is same, width of the lateral groove is same. In such the case, a pitch noise may increase. According to the present invention, the tire having the tread pattern that the trailing position of the block or dummy block is formed at constant cycle and lengths of the block or the dummy block differ is used so that the tire contact state can be estimated without increasing the pitch noise, because the plurality of grooves having different width are formed.

The numeral reference 10 denotes a tire contact state estimating apparatus, 11 denotes an acceleration sensor, 12 denotes a wheel speed sensor, 13 denotes detected frequency band setting unit, 14 denotes a frequency analyzer, 15 denotes a vibration level detector, 16 denotes tire contact state estimation unit, 17 denotes a calculator, 20 denotes a tire for contact state estimation, 21 denotes a wheel, 22 denotes a wheel hub, 23 denotes a knuckle, 24 denotes an upper arm, 25 denotes a lower arm, 26 denotes a damping member, 30B denotes a block row, 31 denotes a circumferential groove, 32 denotes a lateral groove, 33 and 33A~33C denote a block (center block), 33a~33c denote a trailing edge of the block, 34a denote an outer land portion, 34b denote an inner land portion, 35 denote a lug groove, 36 denote a shoulder block and 40 denote a road.

BEST MODE FOR CARRYING OUT THE INVENTION

Hereinafter, the preferred embodiment of the present invention will be described with respect to accompanying drawings.

Figure 1:
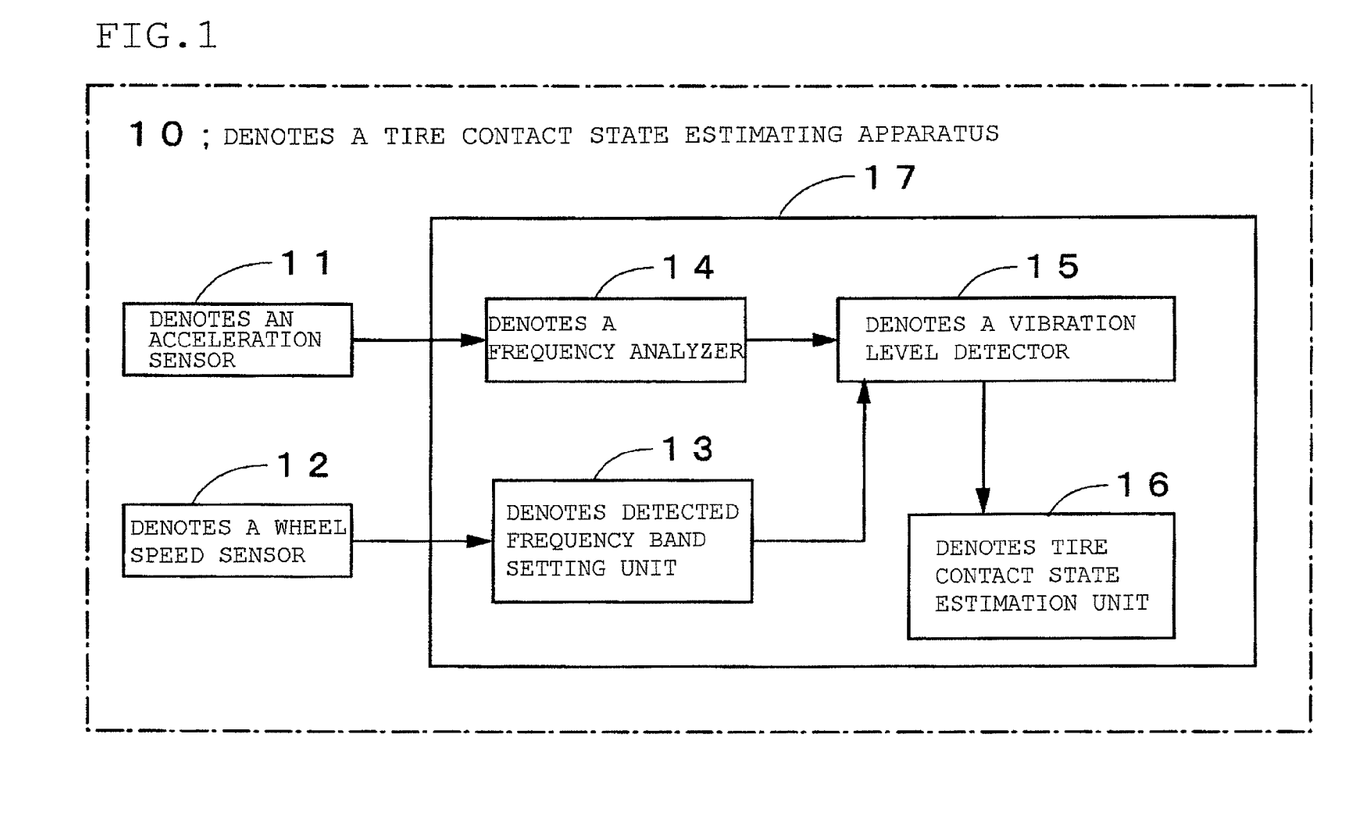
FIG. 1 is a block diagram showing the structure of the tire contact state detection apparatus according to a preferred embodiment of the present invention.
Figure 2:
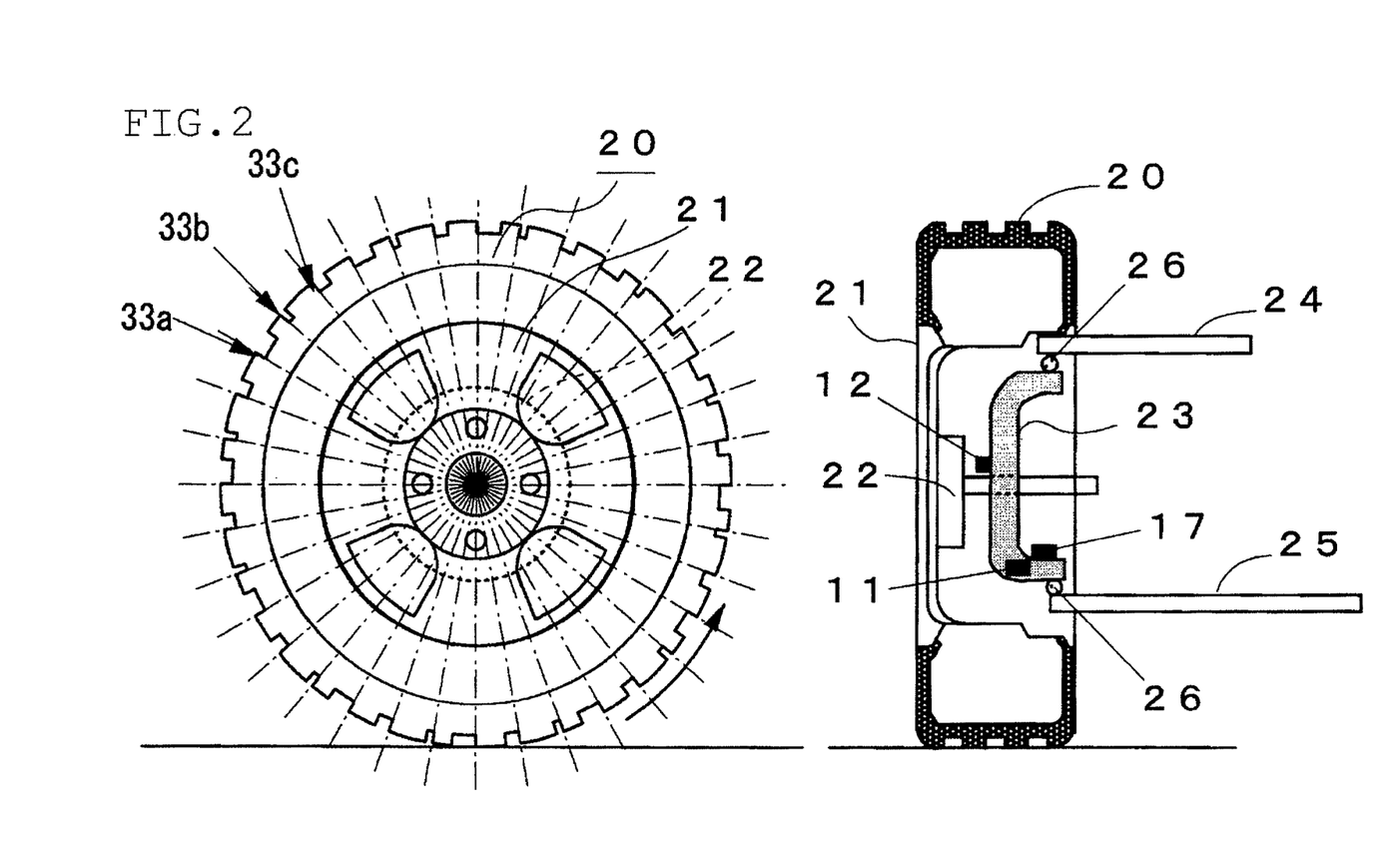
FIG. 2 is a diagram showing structure of the wheel equipped with the tire for the contact state estimation according to the present invention.

FIG. 1 is a functional diagram of the tire contact state estimating apparatus 10 according to the preferred embodiment of the present invention. FIG. 2 is a diagram showing the structure of the wheel equipped with the tire for contact state estimation 20 according to the present invention. In each drawing, the numeral reference 11 denotes the acceleration sensor detecting vibration dispersed to the knuckle 23 from the tire for contact state estimation 20 through the wheel 21 and the wheel hub 22, 12 denotes the wheel speed sensor detecting rotation speed of the wheel 21 during running, 13 denotes the detected frequency band setting unit for detecting vibration level in accordance with wheel speed detected in the wheel speed sensor and cycle of the position of the trailing edge of the block, 14 denotes the frequency analyzer obtaining frequency waveform of vibration with frequency analyzing vibration detected in the acceleration sensor, 15 denotes the vibration level detector detecting magnitude of vibration component in detected frequency band of the frequency waveform, 16 denotes the tire contact state estimation unit estimating tire contact state in accordance with magnitude of vibration component detected in the vibration level detector. The detected frequency band setting unit 13, the frequency analyzer 14, the vibration level detector 15 and the tire contact state estimation unit 16 make up the calculator 17 of the tire contact state estimating apparatus 10.

As the acceleration sensor 11, a piezoelectric acceleration sensor and a semiconductor strain gauge type acceleration sensor are given. That is, it may be preferred to use a piezoelectric type, which is compact and has excellent frequency characteristic.

The knuckle 23 on which the acceleration sensor 11 is mounted is a part of a non-rotatable side of the wheel (a vehicle unsprung part) that is connected through the wheel hub 22 rotating along with the wheel 21 on which the tire for contact state estimation and a bearing. A brake unit, as not shown, is mounted on the knuckle 23. The knuckle 23 is connected to the upper arm 24 and lower arm 25 of the vehicle suspension unit including the suspension member as not shown through a damping member 26 such as a rubber bush. As the wheel speed sensor 12, an electromagnetic induction type rotatable sensor comprising a sensor rotor installed to a rotatable part and a magnetic sensor installed to a non-rotatable part is given.

Next, the tire for contact state estimation of the present invention will be described hereinafter.

Figure 3:
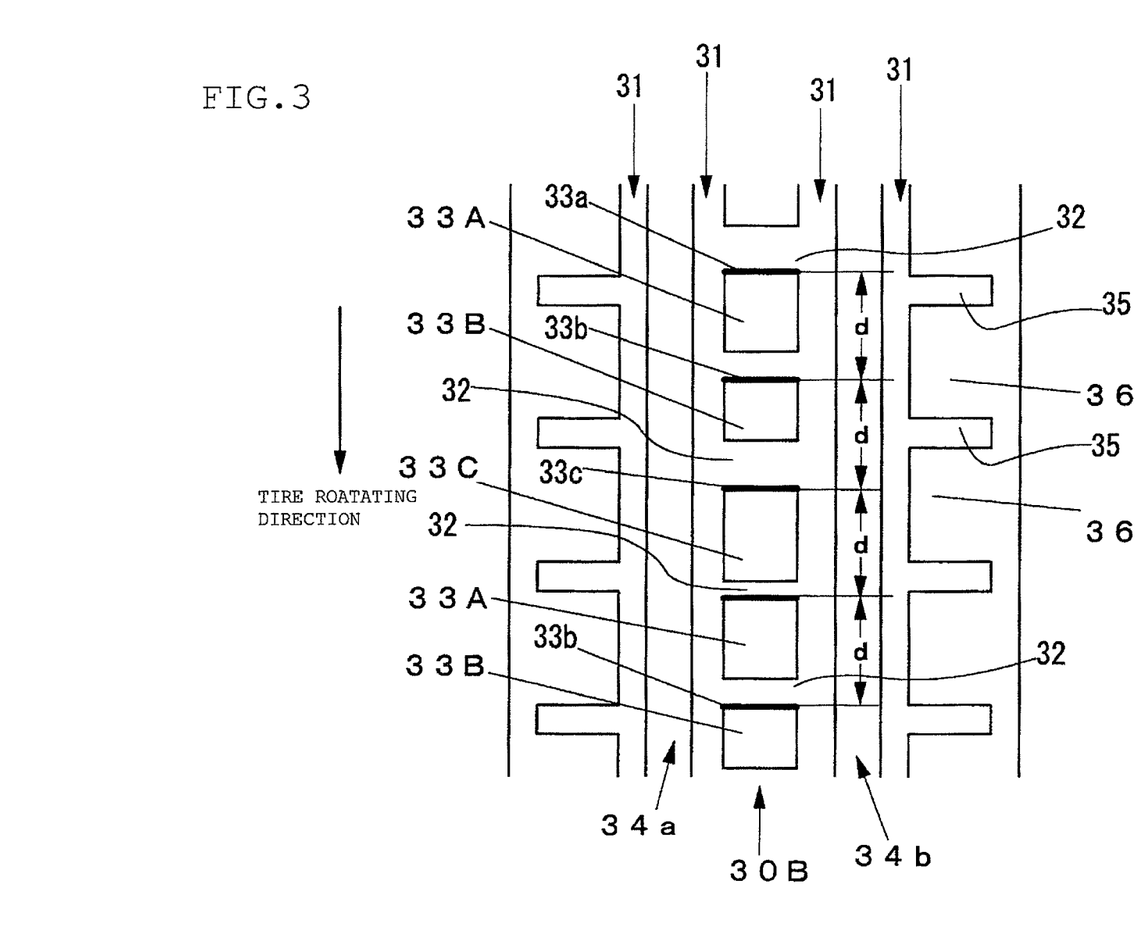
FIG. 3 is a diagram showing an example for tread pattern of the tire for contact state estimation.

FIG. 3 is the diagram showing an example of the tread pattern of the tire for contact state estimation 20 (referred to as "a tire" hereinafter). The tire 20 comprises the plurality of the circumferential groove 31 extending in a tire circumferential direction, the lateral groove 32 extending in a tire axial direction with crossing the circumferential groove 31, the block row 30B that the plurality of blocks 33 (33A~33C) defined by the circumferential groove 31 and lateral groove 32 are arranged along with the tire circumferential direction, the outer land portion 34a which is defined by the circumferential groove and located on an outside of the vehicle when being installed to the vehicle, the inner land portion 34b which is located on the outside of the vehicle when being installed to the vehicle, the plurality of shoulder block 36 defined by the circumferential groove 31 and lug groove 35.

The block row 30B includes three blocks 33A, 33B and 33C whose lengths of the circumferential direction differ each other. The block pattern thereof is formed such a manner in that the distance d between trailing edges block 33 adjacent in the circumferential direction is equal over all circumference. Concretely, regarding the block 33A, the 33B and the block 33C as A, B and C respectively, if they are arranged in such a manner that A, B, C, A, B, C, A, B . . . , distance between the trailing edge 33a of the block 33A and the trailing edge 33b of the block 33B, distance between the trailing edge 33b of the block 33B and the trailing edge 33c of the block 33C and distance the trailing edge 33c of the block 33C and the trailing edge 33a of the block 33A are d.

Viewing it from a side perpendicular to an equatorial plane, as shown in FIG. 2, the trailing edges 33a, 33b and 33c exist on a line extending to a tire radial direction where a circle is divided into N at same angle, regarding a shape of the tire as the circle. The division number N is referred to as "a pattern repeat number", hereinafter.

Figure 4:
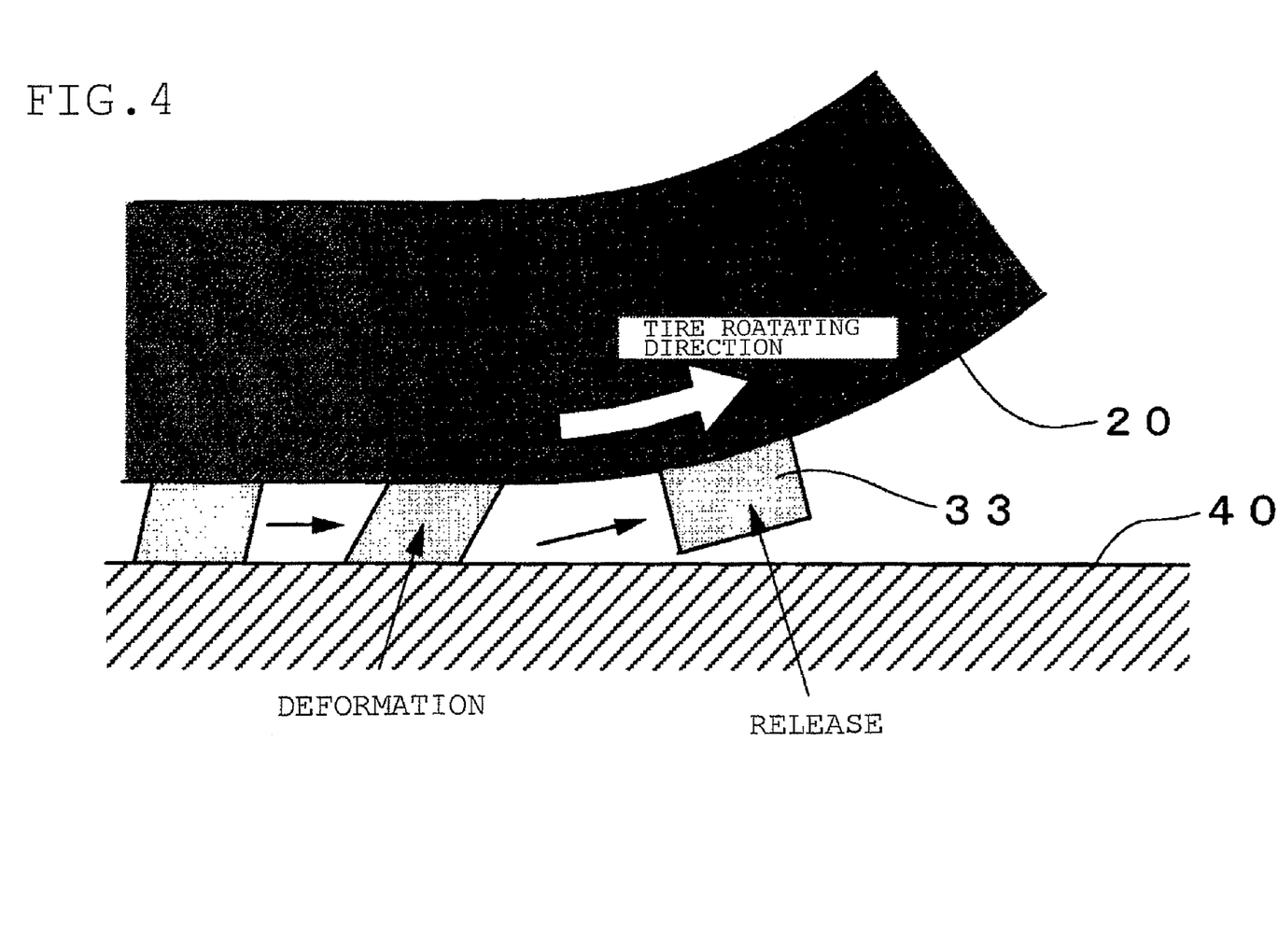
FIG. 4 is a diagram showing deformation state of the block in the tire traveling.

Next, relation between the tire for contact state estimation 20 and the tire contact state thereof will be explained. When the tire 20 rolls, as shown in FIG. 4, deformation amount of the block 33 becomes large toward the trailing. When trailing, deformation is released so that the block 33 vibes in the circumference direction (the tire rotating direction). When a road friction coefficient μ of the road on which the vehicle is running is large, the block 33 is bound by the road 40 until just before trailing. On the other hand, when the road friction coefficient μ is small, since the bounding force is small the block 33 enters into a slipping area on the way to trailing so that the block 33 begins to slip. In the result, large vibration corresponding with the slipping occurs in a small friction road. On the other hand, in an asphalt road, since a slip does not occur, a vibration rarely occurs. When the tire 20 having the block pattern that the distance d between trailing edges of the block 33 adjacent in the circumferential direction is equal over all circumference of the tire is used, the vibration occurs each time when the tire 20 rotates by just d=(L/N), where a pattern repeat number is N.

Figure 5:
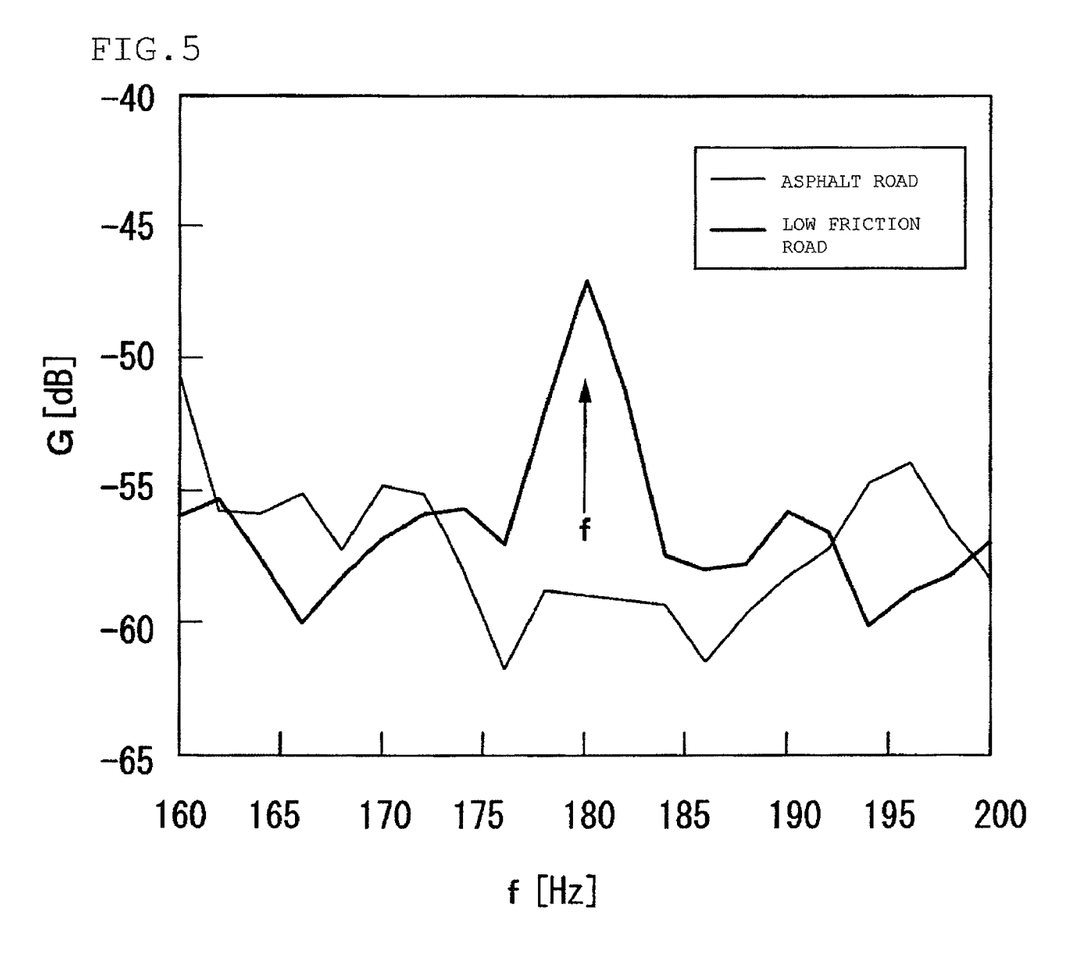
FIG. 5 is a diagram showing frequency wave of vibration detected in the knuckle.

FIG. 5 is a graph showing the result that when a vehicle on which the tire for contact state estimation is mounted is driven on the asphalt road and the small friction road at velocity (wheel speed) V, the vibration detected by the acceleration sensor 11, which is transmitted to the knuckle 23, is frequency-analyzed. As shown in FIG. 5, a frequency waveform in the vicinity of a specified frequency f (here, about 180 Hz) greatly differs in the case of the asphalt road or the small friction road. That is, a frequency peak is indefinite on the asphalt road, while the frequency peak is appeared on the small friction road.

The specified frequency is obtained by following steps, since it occurs each time when the tire 20 rotates by just d=(L/N). Since a circle T of the vibration is value that is obtained by dividing the distance d=(L/N) of the trailing edge of the block 33 by velocity V, that is, it is T=L/(N·V). Therefore, in the frequency waveform of the vibration, f=1/T=(N·V)/L is a peak of the vibration. For example, where L=2 m, N=60 and V=22 km, it is f=183 Hz.

According to the tire contact estimating apparatus 10, the vibration transmitted to the knuckle 23 from the tire through the wheel 21 and the wheel hub 22, which occurs when the trailing edge 33a~33c of the block 33A~33C is left from the road sequentially, is detected by the acceleration detector 11. The detected vibration is transmitted to the frequency analyzer 14. The transmitted vibration is frequency analyzed to obtain the frequency waveform of the vibration. The obtained frequency waveform is transmitted to the vibration level detector 15. Wheel speed V, which is rotation speed of the wheel 21 on which the tire 20 is mounted, is measured by the wheel speed sensor 12 to transmit to the detected frequency band setting unit 13. In the detected frequency band setting unit 13, a center frequency f and a bandwidth Δf are determined for detecting vibration component from the wheel speed V, a round length L and the pattern repeat number N and then it is transmitted to the vibration level detector 15 as the detected frequency band 15. As Δf, for example, it may be about f/10.

The vibrator level detector 15 detects a vibration P in the detected frequency band of the frequency waveform to transmit it to the tire contact state estimation unit 16. The tire contact state estimation unit 16 compares the vibration level P with a threshold K of the vibration level set in advance and estimates that the road is the small friction road when the vibration level P is equal to or more than threshold K, that is, the tire contact state falls in slipping state, and estimates that the road is large friction road when the vibration level P is equal to or less than the threshold K.

As above, according to preferred embodiment, the tire 2, which has the block row 30B on which the plurality of blocks 33A~33C having different length of the tire circumferential direction is arranged in the circumferential direction and has the tread pattern on which the trailing edges of adjacent two block of the block row 30B is formed at predetermined cycle, is used, the periodical vibration to be transmitted to the knuckle 23 from the tire 20 that occurs when the trailing edge is left the road in turn is detected by the acceleration sensor 11 installed to the knuckle 23 so as to obtain the frequency waveform of the vibration, the vibration level in the detected frequency band, which is calculated from wheel speed V detected measured by the wheel speed sensor 12 and the cycle, is detected and the tire contact state is estimated from magnitude of the vibration level so that the tire contact state in driving can be estimated accurately without providing the sensor on the tire 20.

Also, since the acceleration sensor 11 is installed to the knuckle 23 being the non-rotatable member, data on the vibration can be obtained at the non-rotatable side of the wheel without using a slip ring, a ratio unit or the like.

Further, the tire contact estimating apparatus 10 can estimate ease of tire slipping, that is, a grip state of the tire. Therefore, in order to control running state of the vehicle, a vehicle controller is configured to comprise the tire contact state estimating apparatus 10 according to the present invention and the controller for controlling running state of the vehicle in accordance with the tire contact state estimated by the tire contact state estimating apparatus 10. Thereby, safety of the vehicle can be improved moreover.

Figure 6:
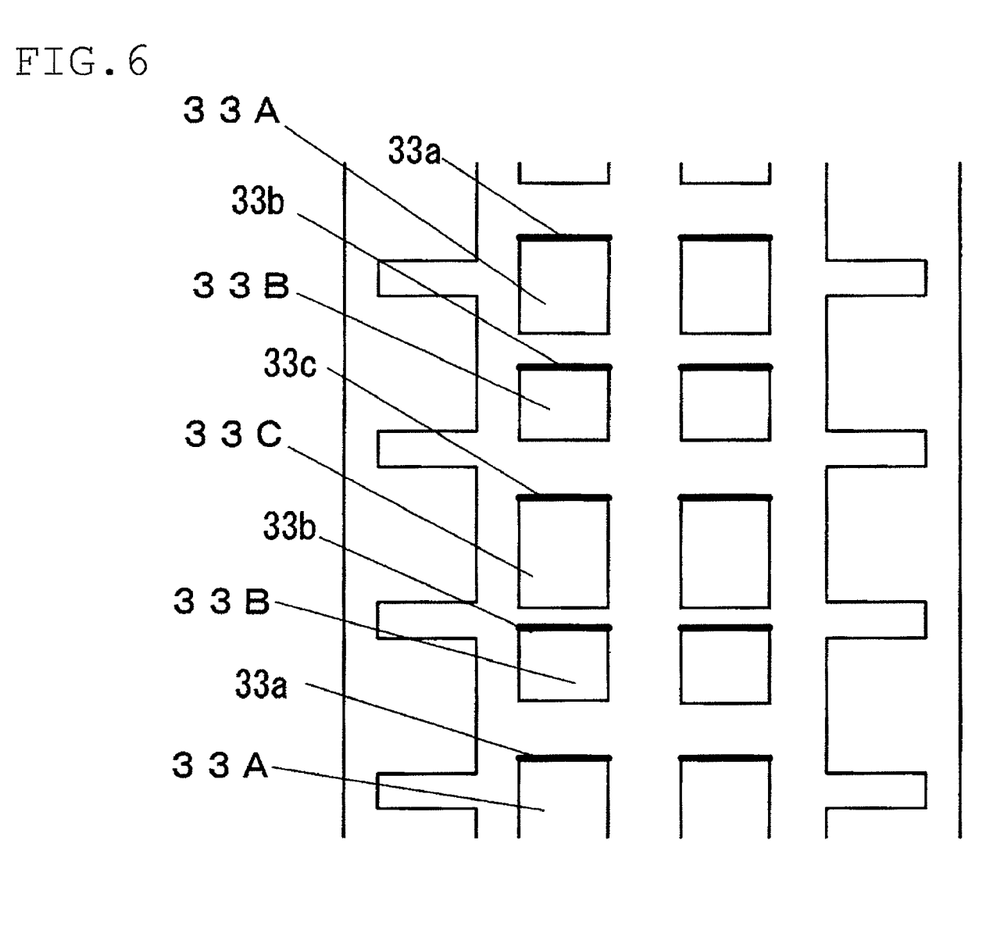
FIG. 6 is a diagram showing other example for tread pattern of the tire for contact state estimation.

The above preferred embodiment describes the tire for contact state estimation 20 having the block pattern on which the block row 30B is formed, which has the brocks 33A~33C regularly arranged in the circumferential direction as A, B, C, A, B, C, A, B . . . . However, as shown in FIG. 6, when there are two block rows, the two block rows may respectively be a block row for detecting a vibration corresponding to a cycle of a position of the trailing edge. Also, only one block row out of the two block rows may be a block for detecting the vibration. Further, since a way of arranging brocks 33A~33C in the circumferential direction may be random, for example, A, B, C, B, A, C, A, C . . . . Therefore, it is not indispensable that the block ends (the trailing edges) of the adjacent blocks is constant, it may be arranged every 1 or 3. That is, it is only necessary that the spaces between the trailing edges of the blocks are aligned.

The block 33 should not be limited to a hexahedron and a chamfer portion may me arranged on the trailing edge or the like.

In the above embodiment, though the blocks having different length of the circumferential direction is 3 kinds of block 33A~33C, it is preferable to arrange many block types such as 6 types or 10 types as well, since S/N ratio of the specified frequency component in the frequency waveform may be improved. However, considering a design for the tread pattern or manufacture of a mold, 6~10 kind may be suitable. The pattern repeat number N is set in accordance with constant block length, total contact area or the like.

Figure 7:
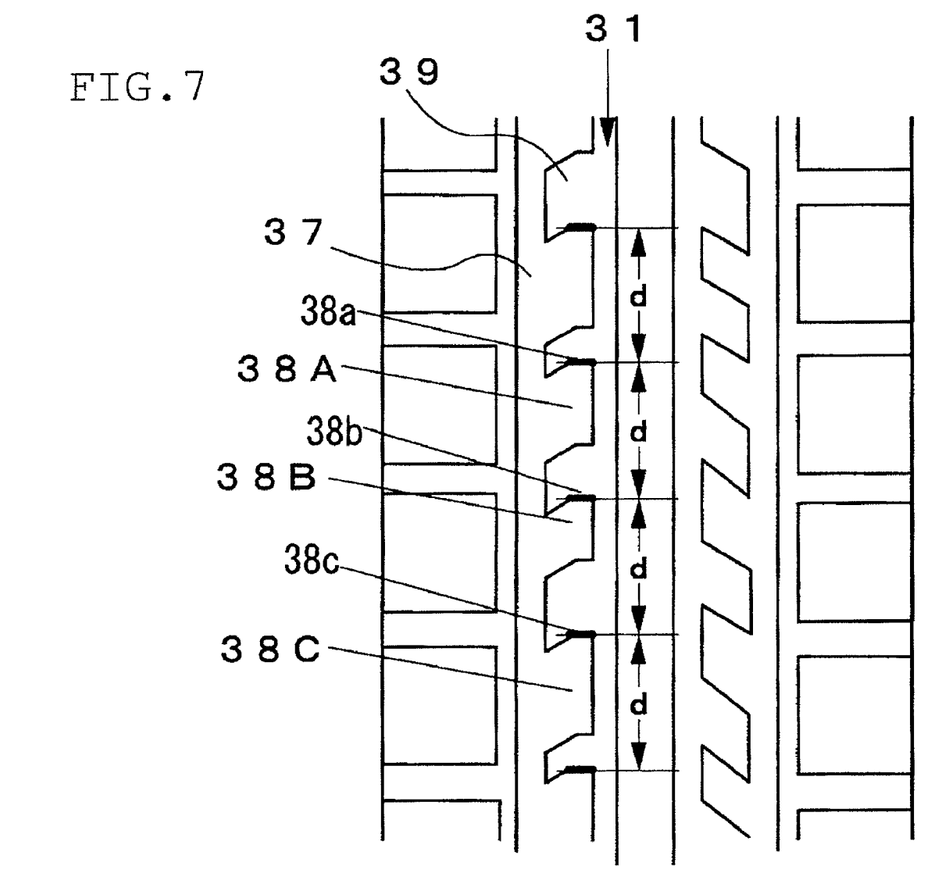
FIG. 7 is a diagram showing other example for tread pattern of the tire for contact state estimation.

The tread pattern of the tire for contact state estimation 20 should not be limited to the above block pattern. As shown in FIG. 7, it is may be a tire having a tread pattern on which a discontinuous land portion is formed in the tire circumferential direction, such as a tire having a rib 37 that is continued in the circumferential direction and has a block pattern having an dummy block 38 (38A~38C). In detail, the dummy blocks 38A~38C are defined by the circumferential groove 31 and the lug groove 39 and are land portions extending in the circumferential groove 31 direction from the rib 37. In such a case, length in the tire circumferential direction differ each other. Also, needless to say, the tread pattern is configured in that distance between trailing edges of the adjacent dummy blocks 38,38, concretely, distance between the trailing edge 38a of the dummy block 38A and the trailing edge of the dummy block 38B, between the trailing edge of the dummy block 38B and the trailing edge of the dummy block 38C and between the trailing edge 38c of the dummy block 38C and the trailing edge 38a of the dummy block 38A, is same.

Though the above embodiment describes only the case of that the trailing edges 33a~33c of the blocks 33A~33C and the trailing edges 33a~33c of the dummy blocks 38A~38C cross with respect to the tire circumferential direction, it is not need so, the trailing edges may incline with respect to the tire circumferential direction.

Though the acceleration sensor 11 is installed to the knuckle 23 in the above embodiment, the vibration can be detected even when it is installed to a rotation side member such as the wheel 21 or wheel hub 22. However, when the sensor such as the acceleration sensor 11 is the rotation side member, it is required that the detected signal may be transmitted to the vehicle side by the slip ring or the radio unit. When the slip ring or the radio unit is used, it is feared that not only parts increase but also data deteriorates due to noise mixing. On the other hand, even if it is installed to the non-rotation side member of the wheel, since the upper arm 24 or the lower arm 25 is connected through the wheel 21 and the damping member 26, that causes problems on detection accuracy such as that the vibration is absorbed so that the vibration level declines or a phase delay occurs. For avoiding the problems, it is preferable to install the acceleration sensor 11 to the knuckle 23 as the present embodiment.

The calculator 17 may be installed to the knuckle 23 as shown in FIG. 2 or the vehicle side.

Example

A tread pattern that a trailing edge of a center block was divided into 60 equal parts on circumference thereof was made on a tread of a tire for a passenger car whose size is 225/45R17. Other parts such as a shoulder block were divided into 45 equal parts.

A vehicle on which the tire was mounted was turned into a small friction road ($\mu$=0.2) from an asphalt road ($\mu$=1.0) at the speed of 22 km/h. Since a circumferential length was 2 m, a center frequency in a detected frequency band was 183 Hz.

FIG. 5 denotes a frequency waveform obtained by arranging an acceleration sensor on a vehicle unsprung portion (a knuckle) and frequency analyzing frequency components of unsprung acceleration at 2 Hz of resolution and 1 second of average time.

Though an obvious peak of the vibration does not appear on the frequency waveform in the case of the asphalt road, it was confirmed that vibration components in the vicinity of 180 Hz that is the calculated frequency is a peak of the frequency waveform.

Figure 8:
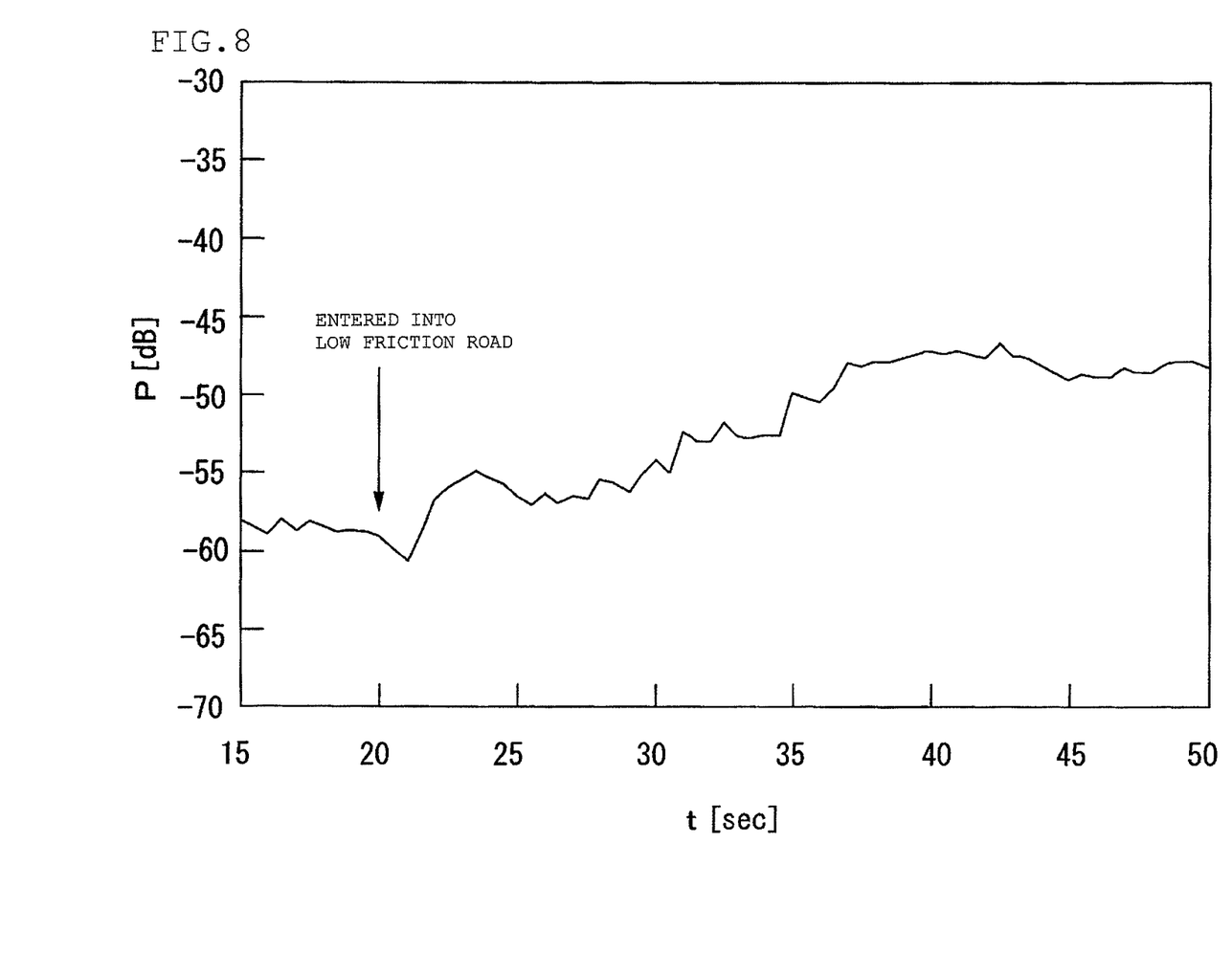
FIG. 8 is a diagram showing change of vibration level when the vehicle goes into a low friction road from a high friction road.

FIG. 8 is a diagram showing time change of vibration components size in the vicinity of 180 Hz of the frequency waveform. From FIG. 8, it is confirmed that vibration components was small when the vehicle ran on the asphalt road while the vibration components became large when the vehicle turned into the small friction road.

INDUSTRIAL APPLICABILITY

As mentioned above, according to the present invention, since the tire contact state can be estimated accurately without arranging the sensor on the tire, the problem on the sensor durability can be resolved, while running safety of the vehicle can be improved.

The invention claimed is:
1. A method of estimating tire contact state comprising steps of:
using a tire having a tread pattern on which a trailing position of a block or a dummy block is formed in a tire circumference direction at a constant cycle, the block is defined by a plurality of circumferential grooves and a lateral groove or a lug groove, and the dummy block projects in a tire axial direction from a land portion continuing in a tire circumference direction;

detecting a vibration transmitted to an unsprung portion of a vehicle from the tire, which occurs when the trailing edge of the block or the dummy block leaves from a road and;

estimating a tire contact state in accordance with magnitude of the vibration component in a frequency band corresponding with the cycle of the detected vibration, wherein, the vibration, which is transmitted to a knuckle which is a non-rotatable member and is located on a wheel side than a damping member disposed on a non-rotatable side of the wheel, is detected.

2. A tire contact state estimating apparatus detecting a tire contact state of a running tire by using a tire having a tread pattern that a trailing position of a block or a dummy block is formed in a tire circumference direction at a constant cycle, the block is defined by a plurality of circumferential grooves and a lateral groove or a lug groove, and the dummy block projects in a tire axial direction from a land portion continuing in a tire circumference direction comprising:

a vibration detector that is disposed on a unsprung portion of a vehicle and detects a vibration on a knuckle which is a non-rotatable member and is located on a wheel side than a damping member disposed on a non-rotatable side of the wheel;

a wheel speed sensor that detects wheel speed;

a detected frequency band setting unit that sets a frequency band for detecting a vibration level in accordance with wheel speed detected by the wheel speed sensor and the cycle;

a vibration level detector which detects magnitude of a vibration component in the frequency band set by the detected frequency band setting unit; and a tire contact state estimating unit which estimates tire contact state in accordance with magnitude of the vibration component detected by the vibration level detector.

* * * * *